United States Patent
Huang

(10) Patent No.: US 11,580,928 B2
(45) Date of Patent: Feb. 14, 2023

(54) CIRCUIT OF CONTROLLING COMMON VOLTAGE OF LIQUID CRYSTAL PANEL

(71) Applicant: OMNIVISION TDDI ONTARIO LIMITED PARTNERSHIP, Grand Cayman (KY)

(72) Inventor: Wang-Jhe Huang, Kaohsiung (TW)

(73) Assignee: OMNIVISION TDDI ONTARIO LIMITED PARTNERSHIP, Grand Cayman (KY)

( * ) Notice: Subject to any disclaimer, the term of this patent is extended or adjusted under 35 U.S.C. 154(b) by 0 days.

(21) Appl. No.: 17/848,130

(22) Filed: Jun. 23, 2022

(65) Prior Publication Data

US 2022/0415281 A1    Dec. 29, 2022

(30) Foreign Application Priority Data

Jun. 24, 2021 (CN) .......................... 202110702881.1

(51) Int. Cl.
  *G09G 3/36* (2006.01)
  *G02F 1/1343* (2006.01)
  *G02F 1/133* (2006.01)

(52) U.S. Cl.
  CPC ....... *G09G 3/3696* (2013.01); *G02F 1/13306* (2013.01); *G02F 1/134336* (2013.01);
  (Continued)

(58) Field of Classification Search
  CPC ............... G09G 3/3655; G09G 3/3696; G09G 2310/06; G09G 2320/0223;
  (Continued)

(56) References Cited

U.S. PATENT DOCUMENTS 7,911,437 B1 * 3/2011 Bell ...................... G09G 3/3685
  345/100
2010/0231569 A1 * 9/2010 Shimatani ............ G09G 3/3688
  345/211

(Continued)

*Primary Examiner* — Sanghyuk Park
(74) *Attorney, Agent, or Firm* — Muncy, Geissler, Olds & Lowe, P.C.

(57) ABSTRACT

The present disclosure relates to a circuit of controlling a common voltage of a liquid crystal panel. According to an embodiment of the present disclosure, a voltage control circuit is configured to provide a common voltage to a common electrode of a liquid crystal panel. The liquid crystal panel includes M rows and N columns of pixel units. Each pixel unit is coupled to the common electrode. The voltage control circuit includes an operational amplifier arranged in a negative feedback configuration. The operational amplifier includes: an input stage, a gain stage and an output stage. The output stage includes a second NMOS transistor and a second PMOS transistor. A gate of the second NMOS transistor receives a first control signal, a drain of the second NMOS transistor is coupled to a gate of a first PMOS transistor, and a source of the second NMOS transistor is coupled to a second reference voltage. A gate of the second PMOS transistor receives a second control signal, a drain of the second PMOS transistor is coupled to a gate of a first NMOS transistor, and a source of the second PMOS transistor is coupled to a third reference voltage.

12 Claims, 6 Drawing Sheets

(52) U.S. Cl.
 CPC . *G09G 2310/06* (2013.01); *G09G 2320/0223* (2013.01); *G09G 2320/0242* (2013.01); *G09G 2320/103* (2013.01); *G09G 2330/021* (2013.01)

(58) Field of Classification Search
 CPC ........ G09G 2320/103; G09G 2330/021; G02F 1/13306; G02F 1/134336
 See application file for complete search history.

(56) References Cited

U.S. PATENT DOCUMENTS

| | | | |
|---|---|---|---|
| 2013/0088473 A1* | 4/2013 | Tsuchi | G09G 3/3291 330/257 |
| 2014/0111496 A1* | 4/2014 | Gomez | G09G 3/3696 345/212 |
| 2016/0334658 A1* | 11/2016 | Jo | G09G 3/3655 |

* cited by examiner

CIRCUIT OF CONTROLLING COMMON VOLTAGE OF LIQUID CRYSTAL PANEL

BACKGROUND OF THE INVENTION

1. Field of the Invention

The present disclosure relates generally to a display panel control technology, and more particularly to a circuit of controlling a common voltage of a liquid crystal panel.

2. Description of the Related Art

In the field of flat panel displays, liquid crystal displays including thin film field effect transistor (TFT) screens have been widely used in the industry due to their advantages of good image quality, small size, light weight, low drive voltage, low power consumption, no radiation, low manufacturing cost, etc.

Most of the liquid crystal displays require a common voltage (hereinafter referred to as a "VCOM voltage") to be provided to their display pixels. The VCOM voltage may be typically generated by, for example, a common voltage regulator (hereinafter referred to as a "VCOM regulator") including an operational amplifier. The VCOM regulator provides the generated VCOM voltage from an output end of the VCOM regulator to all pixels in the liquid crystal displays. A properly calibrated VCOM voltage allows each pixel of the liquid crystal displays to operate properly and prevents damage to pixel materials. The liquid crystal displays having the VCOM voltage generally operate smoothly at a lower frame rate.

However, to meet increasing performance and image quality requirements, a refresh rate of a display panel may be increased to, for example, 120 Hz or 144 Hz. In the above applications with high frame rate, when pixel values change significantly, the VCOM voltage is also significantly affected by a drive voltage of the display panel, and the VCOM regulator may not be able to complete charging/discharging. Furthermore, there is an equivalent parasitic resistance-capacitance (RC) load between the VCOM regulator and each pixel point of the display panel. As the pixel point is farther away from the VCOM regulator, the RC load is larger, whereby time required for charging/discharging by the VCOM regulator is longer, and it will be more unlikely to complete the charging/discharging in time. All the above factors may deteriorate the visual experience of the display panel, and in the case of certain pattern switching, such as green-magenta, the visual experience will be deteriorated more significantly.

In view of this, there is an urgent need in the art to provide improvements to enhance the drive capability of the VCOM regulator.

SUMMARY OF THE INVENTION

The present disclosure provides a circuit of controlling a common voltage of a liquid crystal panel, so as to enhance the drive capability of a VCOM regulator.

According to an embodiment of the present disclosure, a voltage control circuit is proposed for providing a common voltage to a common electrode of a liquid crystal panel. The liquid crystal panel includes M rows and N columns of pixel units each coupled to the common electrode, and both M and N are integers greater than zero. The voltage control circuit includes an operational amplifier arranged in a negative feedback configuration. The operational amplifier includes: an input stage, a gain stage and an output stage. The input stage has a first differential input end, a second differential input end, a first differential output end, and a second differential output end. The first differential input end is configured to receive a first reference voltage. The second differential input end is configured to receive the common voltage. The input stage outputs a first differential output signal pair via the first differential output end and the second differential output end. The gain stage has a third differential input end, a fourth differential input end, a third differential output end, and a fourth differential output end. The third differential input end is coupled to the first differential output end. The fourth differential input end is coupled to the second differential output end. The third differential output end and the fourth differential output end output a second differential output signal pair. The output stage has a fifth differential input end, a sixth differential input end, an output end, a first NMOS transistor, and a first PMOS transistor. The fifth differential input end is coupled to the third differential output end, and the sixth differential input end is coupled to the fourth differential output end. A gate of the first PMOS transistor is coupled to the fifth differential input end, and a gate of the first NMOS transistor is coupled to the sixth differential input end. A source of the first NMOS transistor is coupled to a second reference voltage, a source of the first PMOS transistor is coupled to a third reference voltage, and a drain of the first NMOS transistor and a drain of the first PMOS transistor are coupled together to the output end. The output end outputs the common voltage. The output end is coupled to the common electrode of the liquid crystal panel. The third reference voltage is greater than the first reference voltage. The first reference voltage is greater than the second reference voltage. The output stage further includes a second NMOS transistor and a second PMOS transistor. A gate of the second NMOS transistor receives a first control signal, a drain of the second NMOS transistor is coupled to the gate of the first PMOS transistor, and a source of the second NMOS transistor is coupled to the second reference voltage. A gate of the second PMOS transistor receives a second control signal, a drain of the second PMOS transistor is coupled to the gate of the first NMOS transistor, and a source of the second PMOS transistor is coupled to the third reference voltage.

Embodiments of the present disclosure may enhance the drive capability (i.e. provide the over-drive capability) of a VCOM regulator, thereby significantly improving the performance and image quality of a display panel, particularly the performance and image quality under applications with high frame rate.

PREFERRED EMBODIMENT OF THE PRESENT INVENTION

To better understand the spirit of the present disclosure, a further description is provided below in conjunction with some preferred embodiments of the present disclosure.

A plurality of implementations or examples are provided below to implement different features of the disclosure. A specific example of an assembly and a configuration described below is used to simplify the disclosure. It is contemplated that such descriptions are merely examples, and are not intended to limit the disclosure. For example, in the following description, a first feature is formed on or above a second feature, and the description may include that, in some embodiments, the first feature and the second feature directly contact with each other; and the description may further include that, in some embodiments, an additional assembly is formed between the first feature and the second feature so that the first feature and the second feature may not be in direct contact. In addition, the disclosure may repeat assembly symbols and/or labels in various embodiments. The repetition is for the purpose of brevity and clarity, but does not indicate a relationship between the various embodiments and/or configurations discussed.

Hereinafter, various implementations of the present disclosure will be described in detail. Although specific implementations are discussed, it should be understood that these implementations are merely for illustrative objectives. A person skilled in the relevant art will recognize that other components and configurations may be used without departing from the spirit and the protection scope of the present disclosure.

Figure 1:
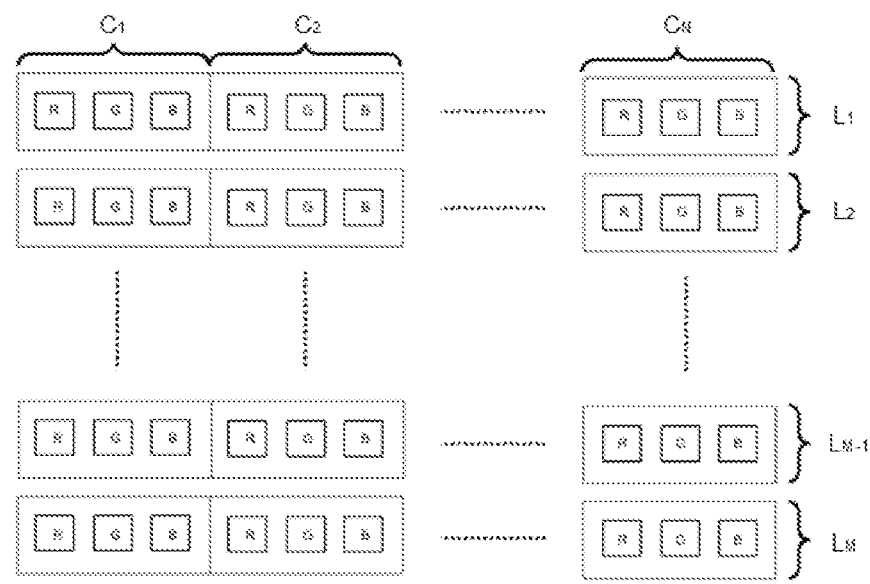
FIG. 1 shows a structure diagram of a pixel array of a liquid crystal panel.

FIG. 1 shows a structure diagram of a pixel array of a liquid crystal panel. As shown in FIG. 1, a liquid crystal panel (10) includes M rows and N columns of pixel units. The M rows of pixel units are shown, in FIG. 1, as a pixel unit row $L_1$, a pixel unit row $L_2$, ..., a pixel unit row $L_{M-1}$, and a pixel unit row $L_M$. The N columns of pixel units are shown, in FIG. 1, as a pixel unit column $C_1$, a pixel unit column $C_2$, ..., a pixel unit column $C_N$. Both M and N are positive integers. Also, each pixel unit in the M rows and N columns of pixel units includes a red sub-pixel, a green sub-pixel and a blue sub-pixel, which are represented by R, G and B, respectively, in FIG. 1. As an embodiment, the liquid crystal panel (10) may be a thin film field effect transistor (TFT) screen.

Figure 2:
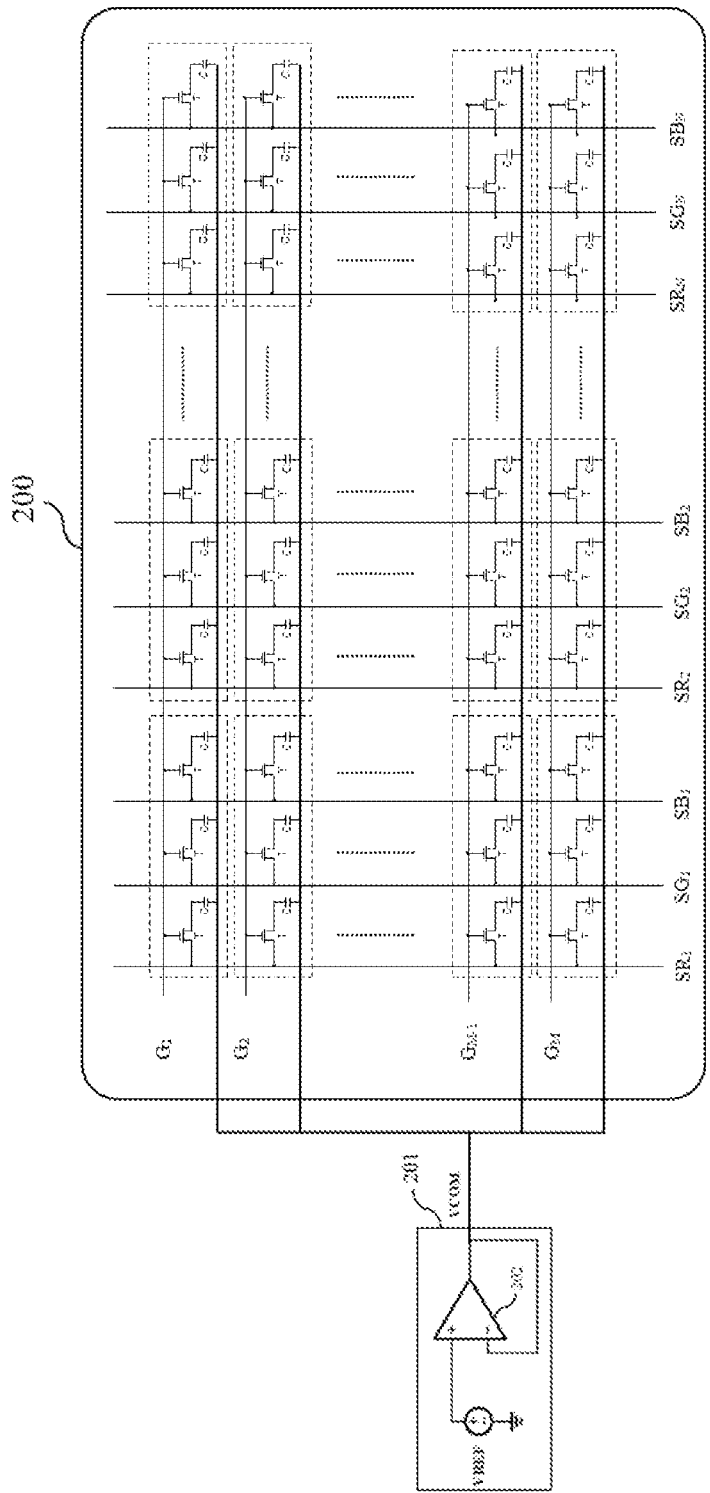
FIG. 2 shows a diagram of a VCOM voltage provided by a VCOM regulator to a pixel array of a liquid crystal panel.

FIG. 2 shows a diagram of a VCOM voltage provided by a VCOM regulator to a pixel array of a liquid crystal panel. Corresponding to the liquid crystal panel (10) shown in FIG. 1, a liquid crystal panel (200) in FIG. 2 includes M rows and N columns of pixel units. Also, each pixel unit in the M rows and N columns of pixel units includes a red sub-pixel, a green sub-pixel and a blue sub-pixel. Each sub-pixel internally includes a transistor T and a capacitor C. A drain of each transistor T is coupled to a data line (for example, the transistor T of the red sub-pixel is coupled to red data lines $SR_1$, $SR_2$, ..., $SR_N$, the transistor T of the green sub-pixel is coupled to green data lines $SG_1$, $SG_2$, ..., $SG_N$, and the transistor T of the blue sub-pixel is coupled to blue data lines $SB_1$, $SB_2$, $SB_N$). A source of each transistor T is coupled to one end of the capacitor C in the sub-pixel where the transistor is located, a gate of each transistor T is coupled to a corresponding scanning line ($G_1$, $G_2$, ..., $G_{M-1}$, and $G_M$), and the other end of each capacitor C is uniformly coupled to a VCOM voltage. The VCOM voltage is provided by a VCOM regulator (201). It should be understood that a parasitic capacitor (not shown) is also included between the source and gate of the transistor T.

In FIG. 2, the VCOM regulator (201) is implemented by an operational amplifier (202) arranged in a negative feedback configuration. A non-inverting input end (+) of the operational amplifier (202) receives a reference voltage VREF, and an inverting input end (−) thereof is coupled to an output end of the operational amplifier (202). The output end of the operational amplifier (202) (i.e. an output end of the VCOM regulator (201)) uniformly provides a VCOM voltage to each pixel unit of the liquid crystal panel (200). However, it should be understood that the VCOM regulator (201) may also provide a stable VCOM voltage by using any suitable circuit and is not limited to being implemented by a negative-feedback operational amplifier.

Figure 3:
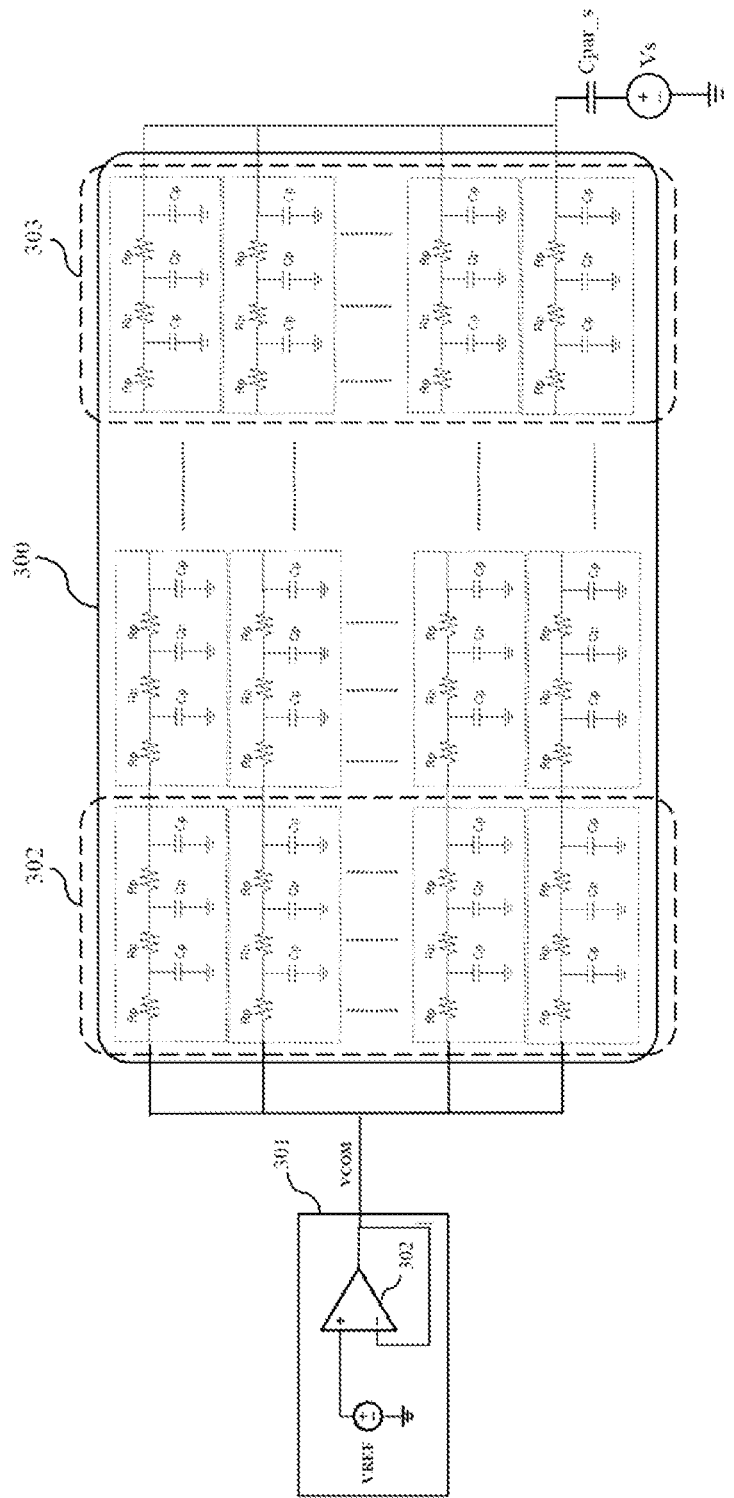
FIG. 3 shows a diagram of a parasitic RC load of a pixel array of a liquid crystal panel.

FIG. 3 shows a diagram of a parasitic RC load of a pixel array of a liquid crystal panel. The schematic diagram of FIG. 3 corresponds to the liquid crystal panel (200) shown in FIG. 2. Specifically, as seen from the output end of the VCOM regulator (201) to the liquid crystal panel (200), an equivalent parasitic resistance Rp and parasitic capacitance Cp contributed by each sub-pixel and a coupling relationship therebetween are as shown in FIG. 2. The VCOM voltage provided by a VCOM regulator (301) is grounded via these parasitic resistances Rp and parasitic capacitances Cp, and all the sub-pixels in each row of pixels are cascaded with each other, thereby forming a parasitic RC network as shown in FIG. 3. Although the parasitic resistance Rp and the parasitic capacitance Cp of each sub-pixel are small, when a liquid crystal panel (300) includes a large number of sub-pixels, a parasitic RC network formed will bring a heavy load to the VCOM regulator (301). It should be understood that there may be slight differences between the parasitic resistance Rp and the parasitic capacitance Cp of the individual sub-pixels, and the slight differences typically depend on the production process and procedure of the liquid crystal panel.

Still referring to FIG. 3, for a pixel column (302) close to an output end of the VCOM regulator (301), the VCOM regulator (301) only needs to drive the limited parasitic resistance capacitance in the pixel column (302). However, for a pixel column (303) far away from the output end of the VCOM regulator (301), the VCOM regulator (301) not only drives the parasitic resistance capacitance in the pixel column (303), but also drives all the parasitic resistance capacitances cascaded with the pixel column (303) in a length direction of the entire liquid crystal panel (300). Obviously, the drive capability of the VCOM regulator (301) for a far-end pixel is much smaller than the drive capability for a near-end pixel, which significantly reduces the overall drive capability of the VCOM regulator (301).

Moreover, when a drive voltage fluctuation of the liquid crystal panel is coupled to a pixel point far away from the output end of the VCOM regulator via a parasitic capacitance, an output voltage of the far-end pixel cannot be stabilized or restored in time. For example, a drive voltage Vs of the liquid crystal panel (300) is coupled to the pixel column (303) far away from the output end of the VCOM regulator (301) via a parasitic capacitance Cpar_s. When the drive voltage Vs fluctuates and affects a pixel output voltage of the pixel column (303) via the parasitic capacitance Cpar_s, the VCOM regulator (301) cannot stabilize the pixel output voltage of the pixel column (303) in time. Since the drive capability of the VCOM regulator (301) is insufficient, the pixel output voltage fluctuation of the pixel column (303) cannot be canceled within a charging/discharging time limited by the standard, whereby the VCOM voltage cannot be returned to a voltage range allowed by the standard. That is, there is a problem of level stability. Also, the above problem becomes particularly prominent under applications with high frame rate (for example, 120 Hz or 144 Hz), thereby seriously affecting the performance and image quality of the display panel.

The above factors may deteriorate the visual experience of the display panel. In particular for green-magenta patterns, the visual experience will be deteriorated more significantly. For example, sub-pixel values corresponding to a green pattern are R=0, G=255 and B=0, and sub-pixel values corresponding to a magenta pattern are R=255, G=0 and B=255. When the liquid crystal panel (300) switches between green and magenta, it is also required that output waveforms on red, green and blue data lines all make maximal jumps so as to realize the above assignment and jump in different directions, i.e. jump from 0 to 255 and from 255 to 0 at the same time, thereby causing the most serious interference to the VCOM voltage and bring a severe challenge to the visual experience of the display panel.

To this end, the present disclosure creatively proposes a circuit of controlling a common voltage of a liquid crystal panel, so as to effectively enhance the drive capability of a VCOM voltage. The circuit will be described in detail below.

Figure 4:
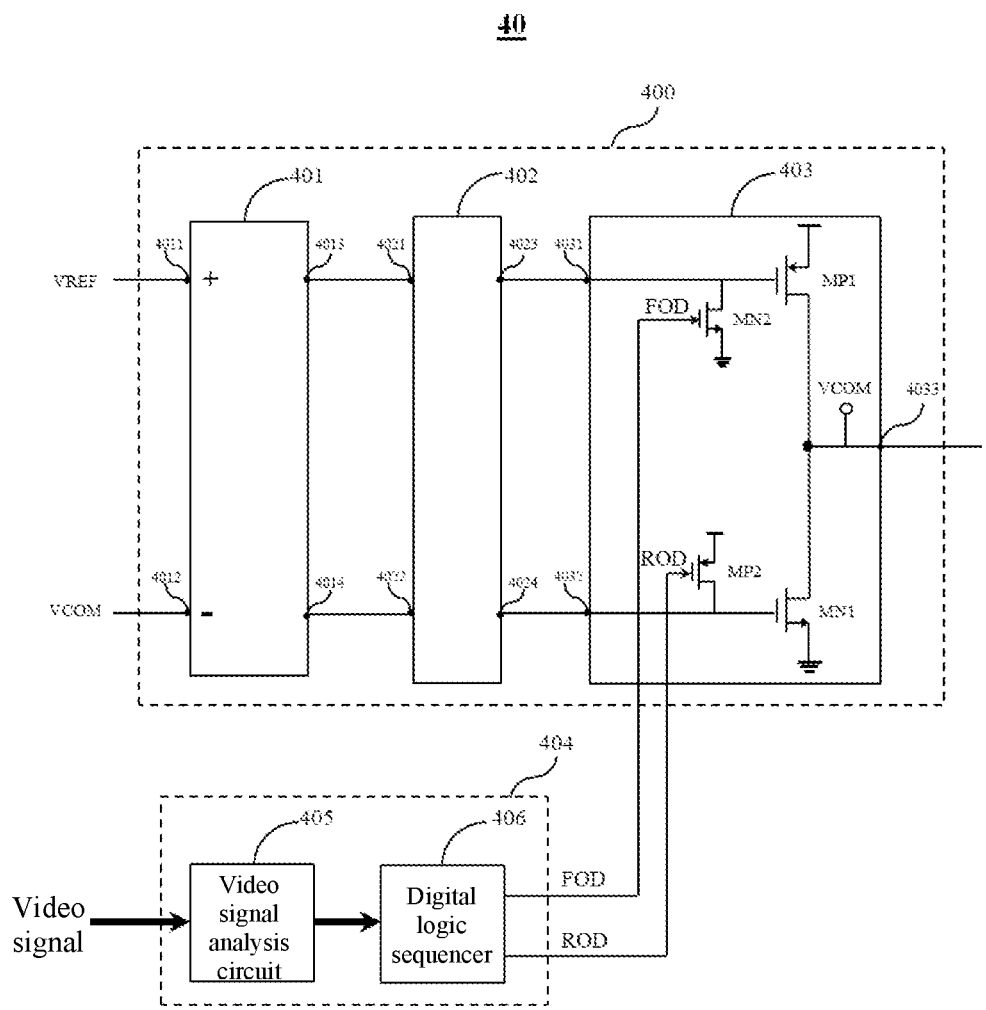
FIG. 4 shows a diagram of a voltage control circuit according to an embodiment of the present disclosure.

FIG. 4 shows a diagram of a voltage control circuit according to an embodiment of the present disclosure. As shown in FIG. 4, a voltage control circuit (40) includes a VCOM regulator implemented by an operational amplifier (400). The operational amplifier (400) includes an input stage (401), a gain stage (402) and an output stage (403). The input stage (401) has a first differential input end (4011), a second differential input end (4012), a first differential output end (4013), and a second differential output end (4014). The first differential input end (4011) serves as a non-inverting input end (+) of the operational amplifier (400) to receive a first reference voltage (VREF). The second differential input end (4012) serves as an inverting input end (−) of the operational amplifier (400) to receive a negative-feedback common voltage (i.e. a VCOM voltage). The input stage (401) outputs a first differential output signal pair via the first differential output end (4013) and the second differential output end (4014).

The gain stage (402) has a third differential input end (4021), a fourth differential input end (4022), a third differential output end (4023), and a fourth differential output end (4024). The third differential input end (4021) is coupled to the first differential output end (4013). The fourth differential input end (4022) is coupled to the second differential output end (4014). The gain stage (402) amplifies the first differential output signal pair output from the first differential output end (4013) and the second differential output end (4014), and outputs an amplified second differential output signal pair via the third differential output end (4023) and the fourth differential output end (4024).

The output stage (403) has a fifth differential input end (4031), a sixth differential input end (4032), an output end (4033), a first NMOS transistor (MN1), and a first PMOS transistor (MP1). The fifth differential input end (4031) is coupled to the third differential output end (4023). The sixth differential input end (4032) is coupled to the fourth differential output end (4024). A gate of the first PMOS transistor (MP1) is coupled to the fifth differential input end (4031) and a gate of the first NMOS transistor (MN1) is coupled to the sixth differential input end (4032). A source of the first NMOS transistor (MN1) is coupled to a second reference voltage (for example, ground voltage). A source of the first PMOS transistor (MP1) is coupled to a third reference voltage (for example, power supply voltage). A drain of the first NMOS transistor (MN1) and a drain of the first PMOS transistor (MP1) are coupled together to the output end (4033). The output end (4033) is coupled in a negative feedback manner to the second differential input end (4012) of the operational amplifier (400), and is coupled to a common electrode of a liquid crystal panel (not shown) to provide a VCOM voltage to the liquid crystal panel. The third reference voltage (for example, power supply voltage) is greater than the first reference voltage (VREF), and the first reference voltage (VREF) is greater than the second reference voltage (for example, ground voltage).

In order to enhance the drive capability of the VCOM voltage, the output stage (403) of the operational amplifier (400) further includes a second NMOS transistor (MN2) and a second PMOS transistor (MP2). A gate of the second NMOS transistor (MN2) is controlled by a first control signal (FOD) (also referred to as a falling edge over-drive signal, hereinafter referred to as a "FOD signal"). A drain of the second NMOS transistor (MN2) is coupled to the gate of the first PMOS transistor (MP1), and a source of the second NMOS transistor (MN2) is coupled to the second reference voltage (for example, ground voltage). A gate of the second PMOS transistor (MP2) is controlled by a second control signal (ROD) (also referred to as a rising edge over-drive signal, hereinafter referred to as a "ROD signal"). A drain of the second PMOS transistor (MP2) is coupled to the gate of the first NMOS transistor (MN1), and a source of the second PMOS transistor (MP2) is coupled to the third reference voltage (for example, power supply voltage). As an embodiment, when the drive voltage of the liquid crystal panel is about to fall, the FOD signal may turn on the second NMOS transistor (MN2) so as to reduce a gate voltage of the first PMOS transistor (MP1), whereby the first PMOS transistor (MP1) charges the output end (4033) in time to increase the VCOM voltage, thereby achieving the purpose of stabilizing the VCOM voltage. Similarly, when the drive voltage of the liquid crystal panel is about to rise, the ROD signal may turn on the second PMOS transistor (MP2) so as to increase a gate voltage of the first NMOS transistor (MN1), whereby the first NMOS transistor (MN1) discharges the output end (4033) in time to reduce the VCOM voltage, thereby achieving the purpose of stabilizing the VCOM voltage. Specific implementations will now be made in detail to the description of FIG. 5.

In an embodiment, the voltage control circuit (40) may further include a control signal generation circuit (404) to provide the FOD signal and the ROD signal to the second NMOS transistor (MN2) and the second PMOS transistor (MP2), respectively, in the operational amplifier (400). The control signal generation circuit (404) includes a video signal analysis circuit (405) and a digital logic sequencer (406).

The video signal analysis circuit (405) analyzes a video signal to be displayed and sends a signal to instruct the digital logic sequencer (406) to generate the required FOD signal or ROD signal. As an embodiment, the video signal includes red, blue and green pixel values, and the video signal analysis circuit generates an analysis result according to a change in the red, blue or green pixel value. For example (but not limited to), when the red, blue or green pixel value changes from a first value to a second value that is higher than the first value (for example, when the red, blue or green pixel value changes from 0 to 255), the ROD signal controls the second PMOS transistor (MP2) to be turned on. In order to accurately reflect the degree of increase in the pixel value, a length of time in which the ROD signal controls the second PMOS transistor (MP2) to be turned on may further be directly proportional to a difference between the second value and the first value. Similarly, when the red, blue or green pixel value changes from a third value to a fourth value that is lower than the third value (for example, when the red, blue or green pixel value changes from 255 to 0), the FOD signal controls the second NMOS transistor (MN2) to be turned on. In order to accurately reflect the degree of decrease in the pixel value, a length of time in which the FOD signal controls the second NMOS transistor (MN2) to be turned on may further be directly proportional to a difference between the third value and the fourth value.

The digital logic sequencer (406) generates the FOD signal and the ROD signal that do not overlap with each other according to the indication of the video signal analysis circuit (405) and according to a system timing sequence. That is, it is ensured that the second NMOS transistor (MN2) and the second PMOS transistor (MP2) are not turned on simultaneously.

Figure 5:
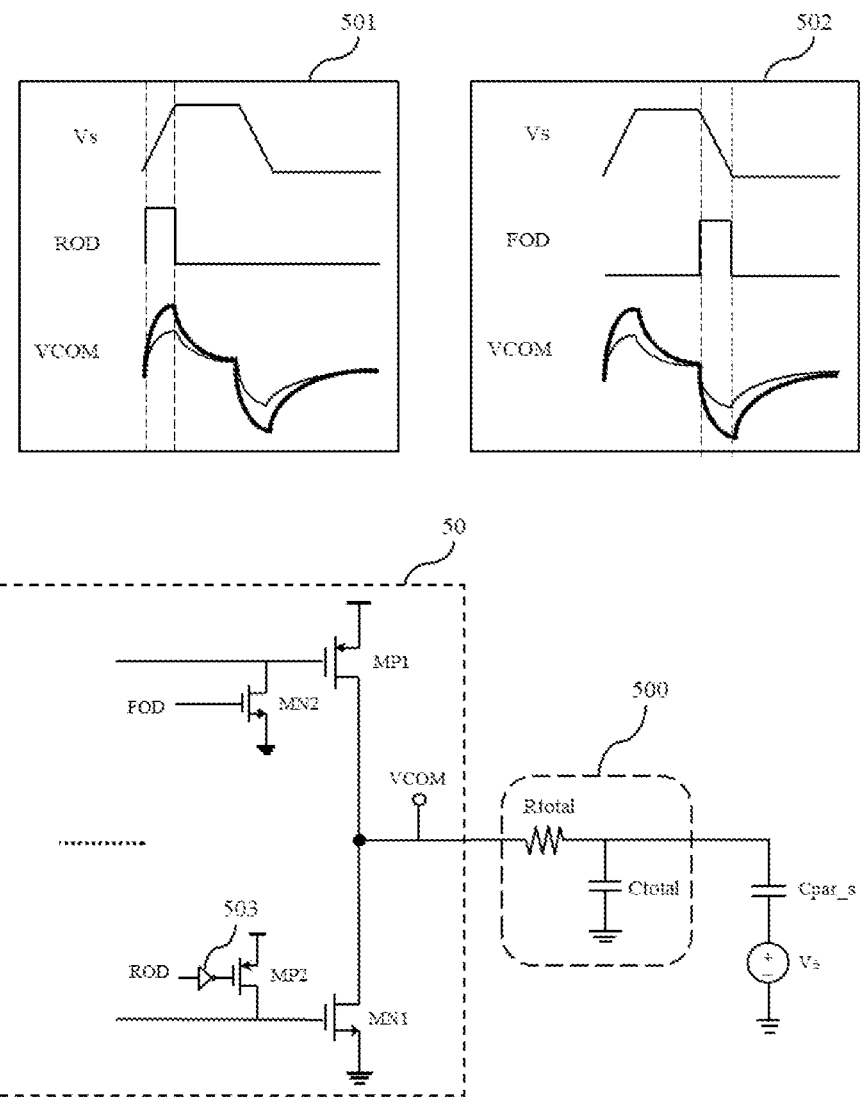
FIG. 5 shows circuit and related waveform diagrams for enhancing the drive capability of a VCOM voltage according to an embodiment of the present disclosure.

FIG. 5 shows circuit and related waveform diagrams for enhancing the drive capability of a VCOM voltage according to an embodiment of the present disclosure. The lower part of FIG. 5 shows a circuit structure of a voltage control circuit (50) providing a VCOM voltage to a liquid crystal panel (500). For the convenience of discussion, the voltage control circuit (50) in FIG. 5 shows only an output stage circuit of an operational amplifier. The topological structures of the first NMOS transistor (MN1), the first PMOS transistor (MP1), the second NMOS transistor (MN2), and the second PMOS transistor (MP2) are the same as those in FIG. 4, and will not be described again. The difference is that the ROD signal is coupled to the gate of the second PMOS transistor (MP2) via an inverter (503). Furthermore, for the convenience of discussion, a parasitic RC network in the liquid crystal panel (500) is simplified as a parasitic resistance Rtotal and a parasitic capacitance Ctotal, and a drive voltage Vs is provided to the liquid crystal panel (500) via a parasitic capacitance Cpar_s.

The upper part of FIG. 5 shows related waveform diagrams for enhancing the drive capability of a VCOM voltage, respectively. Referring to a waveform diagram (501), when the drive voltage Vs rises, if the voltage control circuit proposed in the present disclosure is not adopted, the VCOM voltage will rise with the rising of the drive voltage Vs as shown by thick solid lines in a VCOM waveform, and then fall back after the drive voltage Vs is stabilized at a high potential. However, when the voltage control circuit proposed in the present disclosure is adopted, once the drive voltage Vs rises, the ROD signal may be synchronously increased and maintained for a period of time (the length of time may be, for example but is not limited to, approximately the same as the rising time of the drive voltage Vs), whereby the second PMOS transistor (MP2) is turned on and a portion of the VCOM voltage is additionally reduced by the first NMOS transistor (MN1). Then, the VCOM voltage may rise only slightly with the rising of the drive voltage Vs as shown by thin solid lines in the VCOM waveform, and then quickly fall back after the drive voltage Vs is stabilized at a high potential, thereby stabilizing the VCOM voltage in time. It should be understood that similarly, further referring to a waveform diagram (502), when the drive voltage Vs falls, if the voltage control circuit proposed in the present disclosure is not adopted, the VCOM voltage will sharply fall with the falling of the drive voltage Vs as shown by thick solid lines in a VCOM waveform, and then rise again after the drive voltage Vs is stabilized at a low potential. However, when the voltage control circuit proposed in the present disclosure is adopted, once the drive voltage Vs falls, the FOD signal may be synchronously increased and maintained for a period of time (the length of time may be, for example, but is not limited to, approximately the same as the falling time of the drive voltage Vs), whereby the second NMOS transistor (MN2) is turned on and a portion of the VCOM voltage is additionally increased by the first PMOS transistor (MP1). Then, the VCOM voltage may fall only slightly with the falling of the drive voltage Vs as shown by thin solid lines in the VCOM waveform, and then quickly rise again after the drive voltage Vs is stabilized at a low potential, thereby stabilizing the VCOM voltage in time.

Figure 6:
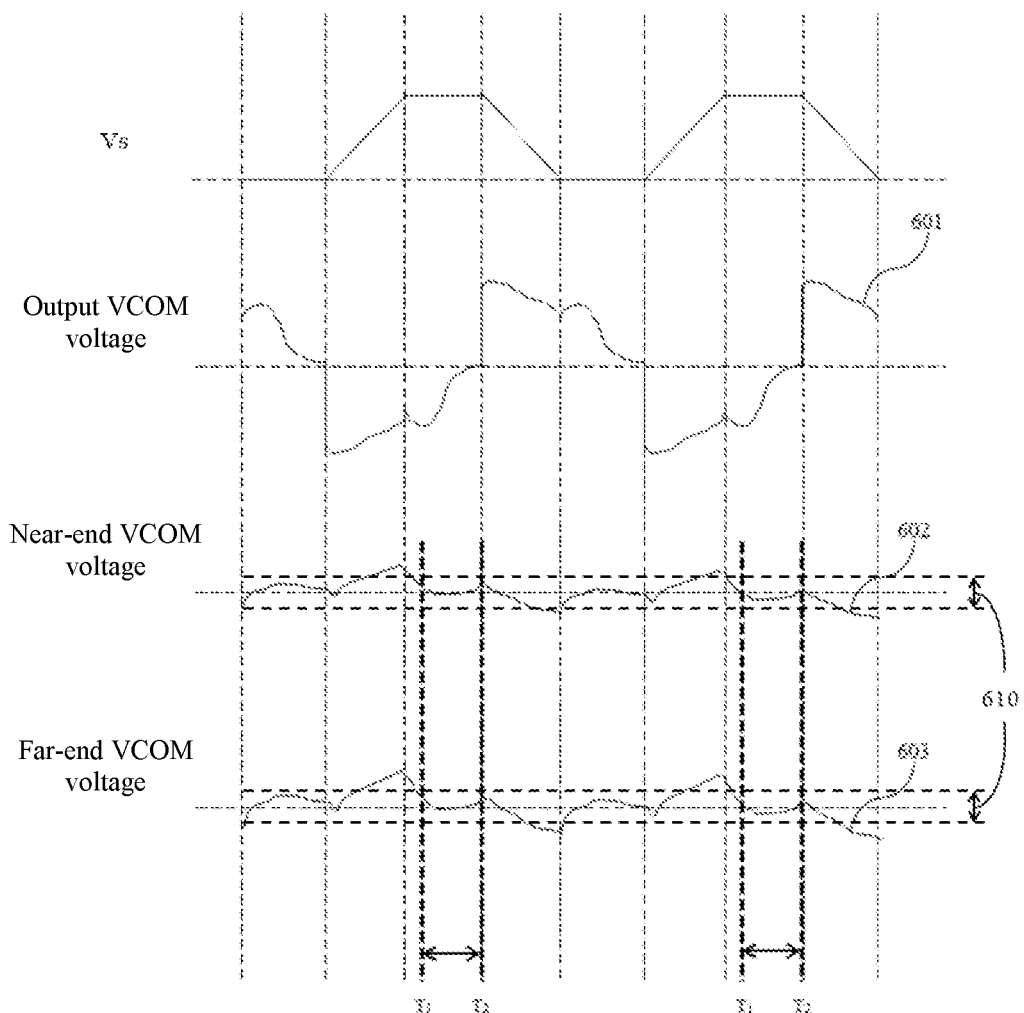
FIG. 6 shows an effect waveform diagram for enhancing the drive capability of a VCOM voltage according to an embodiment of the present disclosure.

FIG. 6 shows an effect waveform diagram for enhancing the drive capability of a VCOM voltage according to an embodiment of the present disclosure. As shown in FIG. 6, the drive voltage Vs of the liquid crystal panel fluctuates such as rising or falling, thereby affecting an actual VCOM voltage applied to each pixel of the liquid crystal panel.

Since there is a fluctuation in the drive voltage Vs, the voltage control circuit (40) of the present disclosure, in order to cancel the fluctuation, will make an actual output VCOM voltage, i.e. the VCOM voltage at the output end (4033) changed oppositely with the rising and falling of the drive voltage Vs, so that the VCOM voltage can meet the standard specification when being transferred to each sub-pixel of the liquid crystal panel.

Referring to FIG. 6, since the voltage control circuit (40) of the present disclosure has analyzed a video signal to be displayed and generated required control signals (for example, FOD and ROD signals) in a targeted manner, when the drive voltage Vs fluctuates, the voltage control circuit (40) can output an output VCOM voltage (601) opposite to the rising and falling of the drive voltage Vs at the output end (4033) thereof. Thanks to this, a near-end VCOM voltage slightly fluctuates only as the drive voltage Vs fluctuates and quickly converges during the period when the drive voltage Vs is stabilized, as shown by a near-end VCOM voltage waveform (602).

Similarly, a far-end VCOM voltage also slightly fluctuates only as the drive voltage Vs fluctuates and quickly converges during the period when the drive voltage Vs is stabilized, as shown by a far-end VCOM voltage waveform (603). As can be seen from FIG. 6, in the case where a standard specification ensures that the VCOM voltage converges to a preset voltage error threshold interval (610) at time T1 and continues to keep converging from time T1 to time T2, both the enhanced near-end VCOM voltage waveform (602) and the far-end VCOM voltage waveform (603) can ensure that the above standard specification is met, even though the far-end VCOM voltage waveform (603) converges at a slightly slower speed than the near-end VCOM voltage waveform (602) due to a relatively large parasitic RC load thereof.

As an embodiment, a chip may include the control circuit described in the various embodiments above. Further, the chip and a liquid crystal panel (for example, a thin film field effect transistor (TFT) screen) controlled by the chip may be included in an electronic device.

The circuit of controlling a common voltage of a liquid crystal panel proposed in the present disclosure can effectively enhance the drive capability of a VCOM regulator and improve the performance and image quality of a display panel under applications with high frame rate.

It is to be noted that, the term "an embodiment in the present disclosure" or a similar term that appears in this specification, with reference to its purpose, is intended to point out that a specific feature, structure, or property described together with another embodiment is included in at least one embodiment and is not necessarily presented in all embodiments. Therefore, when the term "an embodiment in the present disclosure" or a similar term correspondingly appears throughout this specification, it does not necessarily represent a same embodiment.

In addition, the specific feature, structure, or property of any specific embodiment may be combined in any suitable manner with one or more other embodiments.

The technical contents and technical features of the present disclosure have been described by using the foregoing related embodiments. However, the foregoing embodiments are merely examples for implementing the present disclosure. A person skilled in the art may still make replacements and modifications based on the teachings and the disclosures of the present disclosure without departing from the spirit of the present disclosure. Therefore, the disclosed embodiments of the present disclosure do not limit the scope of the present disclosure. On the contrary, modifications and equivalent arrangements included in the spirit and scope of the claims are all included in the scope of the present disclosure.

What is claimed is:

1. A voltage control circuit for providing a common voltage to a common electrode of a liquid crystal panel, the liquid crystal panel comprising M rows and N columns of pixel units each coupled to the common electrode, and both M and N being integers greater than zero, wherein the voltage control circuit comprises:

an operational amplifier arranged in a negative feedback configuration, the operational amplifier comprising:

an input stage having a first differential input end, a second differential input end, a first differential output end, and a second differential output end, wherein the first differential input end is configured to receive a first reference voltage, the second differential input end is configured to receive the common voltage, and the input stage outputs a first differential output signal pair via the first differential output end and the second differential output end;

a gain stage having a third differential input end, a fourth differential input end, a third differential output end, and a fourth differential output end, wherein the third differential input end is coupled to the first differential output end, the fourth differential input end is coupled to the second differential output end, and the third differential output end and the fourth differential output end output a second differential output signal pair; and an output stage having a fifth differential input end, a sixth differential input end, an output end, a first NMOS transistor, and a first PMOS transistor, wherein the fifth differential input end is coupled to the third differential output end, and the sixth differential input end is coupled to the fourth differential output end; a gate of the first PMOS transistor is coupled to the fifth differential input end, and a gate of the first NMOS transistor is coupled to the sixth differential input end; a source of the first NMOS transistor is coupled to a second reference voltage, a source of the first PMOS transistor is coupled to a third reference voltage, and a drain of the first NMOS transistor and a drain of the first PMOS transistor are coupled together to the output end; the output end outputs the common voltage, and the output end is coupled to the common electrode of the liquid crystal panel;

the third reference voltage is greater than the first reference voltage, and the first reference voltage is greater than the second reference voltage;

wherein the output stage further comprises a second NMOS transistor and a second PMOS transistor; a gate of the second NMOS transistor receives a first control signal, a drain of the second NMOS transistor is coupled to the gate of the first PMOS transistor, and a source of the second NMOS transistor is coupled to the second reference voltage; and a gate of the second PMOS transistor receives a second control signal, a drain of the second PMOS transistor is coupled to the gate of the first NMOS transistor, and a source of the second PMOS transistor is coupled to the third reference voltage.

2. The voltage control circuit according to claim 1, wherein when the first control signal controls the second NMOS transistor to be turned on, a gate voltage of the first PMOS transistor is reduced to increase the common voltage at the output end of the output stage; and when the second control signal controls the second PMOS transistor to be turned on, a gate voltage of the first NMOS transistor is increased to reduce the common voltage at the output end of the output stage.

3. The voltage control circuit according to claim 2, wherein the second NMOS transistor and the second PMOS transistor are not turned on simultaneously.

4. The voltage control circuit according to claim 1, further comprising:

a control signal generation circuit;

a video signal analysis circuit, configured to generate an analysis result according to a video signal to be played on the liquid crystal panel; and a digital logic sequencer, configured to generate the first control signal and the second control signal according to the analysis result.

5. The voltage control circuit according to claim 4, wherein the video signal comprises red, blue and green pixel values, and the video signal analysis circuit generates the analysis result according to a change in the red, blue or green pixel value.

6. The voltage control circuit according to claim 5, wherein the second control signal controls the second PMOS transistor to be turned on when the red, blue or green pixel value changes from a first value to a second value that is higher than the first value.

7. The voltage control circuit according to claim 6, wherein the second control signal controls a length of time in which the second PMOS transistor is turned on to be positively correlated to a difference between the second value and the first value.

8. The voltage control circuit according to claim 5, wherein the second control signal controls the second NMOS transistor to be turned on when the red, blue or green pixel value changes from a third value to a fourth value that is lower than the third value.

9. The voltage control circuit according to claim 8, wherein the second control signal controls a length of time in which the second NMOS transistor is turned on to be positively correlated to a difference between the third value and the fourth value.

10. The voltage control circuit according to any claim 1, wherein the liquid crystal panel is a thin film field effect transistor screen.

11. A chip, comprising:
the voltage control circuit according to any claim 1.

12. An electronic device, comprising:
the chip according to claim 11; and
the liquid crystal panel.

* * * * *